United States Patent Office 3,504,166
Patented Mar. 31, 1970

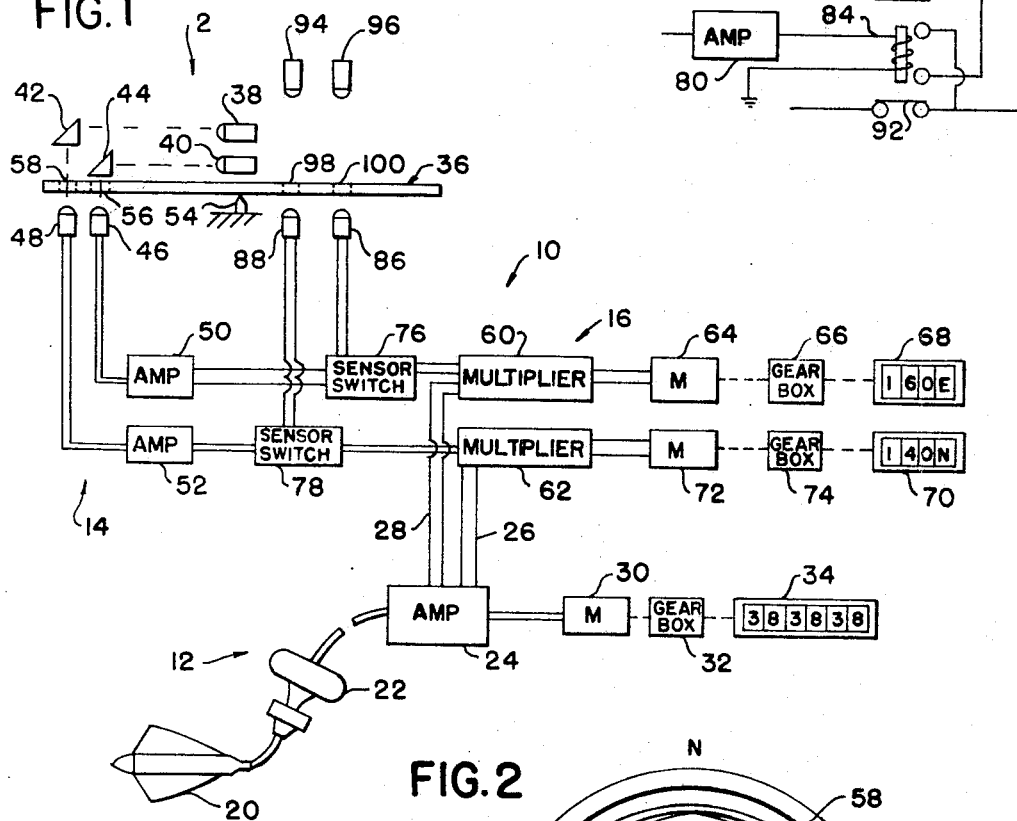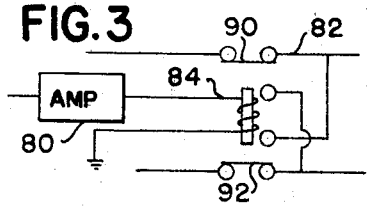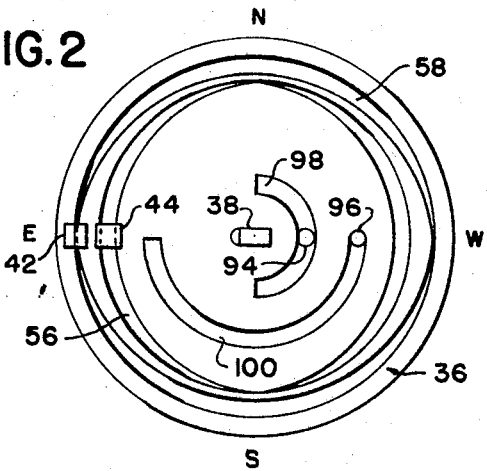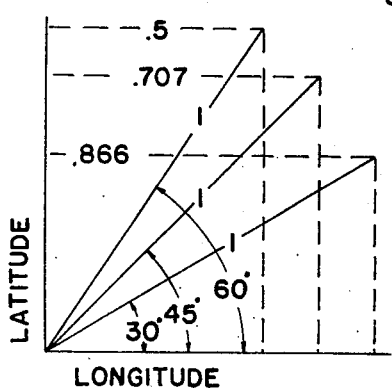

3,504,166
POSITION INDICATING APPARATUS
James M. Spencer, Jr., 2515 Mercedes Drive,
Fort Lauderdale, Fla. 33316
Filed Oct. 12, 1964, Ser. No. 403,090
Int. Cl. G06f 15/50; G06g 7/22, 7/28
U.S. Cl. 235—150.271                    5 Claims

ABSTRACT OF THE DISCLOSURE

Structure is disclosed for indicating the latitude and longitude of a vehicle, such as a boat continuously. In accordance with the invention a disc having transparent portions is combined with light sources and photoelectric cells to produce electric signals varying in magnitude in accordance with the east and west and the north and south components of a direction of travel. Separate and distinct means are provided for developing a signal having a magnitude varying with speed. The east and west and north and south signal components are then multiplied by the speed signal in multiplying circuits to provide output signals, the integrated magnitude of which give an indication of distance travelled which is displayed as latitude and longitude position. Means are provided in conjunction with the disc for reversing the algebraic sign of the east and west and north and south signal components to provide north and south and east and west movement differentiation.

---

The invention relates to position indicating apparatus and refers more specifically to automatic navigation equipment for providing a continuous visual indication of the exact latitude and lonigtude of boats.

In the past navigation of boats, particularly of relatively small boats, has been primarily by the use of dead-reckoning wherein time and speed are multiplied to provide a distance indication. With direction known from a compass or the like position is then computed. Navigation equipment for boats and the like has included apparatus, such as sextants, for determining latitude and longitude by a reference to the heavenly bodies, such as the stars and sun, and electronic navigational aids, such as shoran and loran equipment.

Dead reckoning while providing accurate navigation, particularly for short trips wherein periodic checks with known land-marks may be made provides only periodic indications of location, that is to say, continuous indication of position is not provided thereby and the calculations necessary in dead-reckoning navigation are time consuming and tedious. Position determining by means of a sextant or similar instrument while highly accurate and dependable is impossible in certain weather conditions, requires expert knowledge of the equipment used and again results in only periodic position checks. The electronic aids to navigation, such as shoran and loran, while sometimes capable of providing a continual indication of position are expensive and require expert knowledge of the operation thereof.

It is therefore the purpose of the invention to provide improved position indicating apparatus.

Another object is to provide automatic navigation equipment for boats and the like providing a continuous visual indication of position.

Another object is to provide automatic navigation equipment for boats or the like capable of presenting a continuous visual indication of latitude and longitude of position and including a compass card and the usual speed indicating apparatus.

Another object is to provide automatic navigation equipment for boats or the like capable of providing a continuous visual indication of latitude and longitude of position, including means for developing a signal proportional to speed means for developing a signal proportional to direction moved east or west, means for multiplying the speed signal together with each of the east and west signals and integrating the resulting signals separately to provide separate analog signals for displaying latitude and longitude of position.

Another object is to provide automatic navigation equipment as set forth above and further including means for sensing whether the north and south and the east and west signals are north or south and east or west movement indications.

Another object is to provide automatic navigation equipment which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a partially block diagram and partially diagrammatic diagram of automatic navigation equipment constructed in accordance with the invention.

FIGURE 2 is a top plan view of a portion of the automatic navigation equipment illustrated in FIGURE 1 taken in the direction of arrow 2 in FIGURE 1.

FIGURE 3 is a schematic diagram of the sensor switch of the automatic navigation equipment illustrated in FIGURE 1.

FIGURE 4 is a diagram useful in explaining the operation of the automatic navigation equipment illustrated in FIGURES 1–3.

With particular reference to the figures of the drawing, one embodiment of the present invention will now be disclosed in detail.

As shown in FIGURE 1, the automatic navigation equipment 10 includes apparatus 12 for developing an electric signal the magnitude of which is proportional to the speed of the boat in which the automatic navigation equipment is positioned, apparatus 14 for developing electric signals the magnitude of which are proportional to the direction of travel of the boat in both east or west and north or south directions and means 16 for multiplying the speed signal and with the latitude and longitude signals to provide output signals the analog of which are representative of the latitude and longitude of the boat at all times.

More specifically, the apparatus 12 includes the ship's log 20, magnetic coupling 22 and amplifier 24 operable to produce an electric output over the conductors 26 and 28 which varies in accordance with the speed through the water of the boat (not shown) in which the automatic navigation equipment 10 is mounted. The ship's log 20 and magnetic coupling 22 are common articles of commerce and are used in conjunction with the amplifier 24, motor 30, gear box 32 and odometer indicator 34 to indicate the distance travelled by the boat. The odometer may be combined with a speedometer if desired. Such systems are well known and are for example disclosed in Patent No. 3,137,164, dated June 16, 1964.

The apparatus 14 for providing separate electric signals proportional to the direction travelled in latitude and longitude includes the compass card 36, light sources 38 and 40, prisms 42 and 44, and photoelectric cells 46 and 48 connected to amplifiers 50 and 52.

As shown best in FIGURE 2, the compass card 36, which may be the compass card for the usual boat compass modified as shown, is freely movable about the pivot mounting 54 thereof so that an exact orientation therefor relative to the earth's magnetic field is always maintained. Compass card 36 is provided with the transparent annular portions 56 and 58. The transparent annular portion 58 is operably associated with the degrees of latitude and is varied from a maximum width at the north and south compass directions, as shown in FIGURE 2, to zero at the east and west compass directions. The annular transparent portion 56 of compass card 36 is associated with the degrees of longitude and varies from a maximum width at the east, west compass directions to zero at the north, south compass directions.

As will be seen subsequently the width of the transparent portions 56 and 58 vary respectively from a maximum to a minimum in accordance with the sine of the angle formed between the direction in which the boat is travelling and a parallel of longitude and latitude respectively.

Reference to FIGURE 4 will show that, for example, for a boat travelling at an angle of thirty degrees to a parallel of latitude and thus at an angle of sixty degrees to a parallel of longitude, that the distance the boat will travel in a direction to change the longitude will be .866 of the total travel of the boat. The distance the boat travels to change the latitude in the same time will be .5 of the total distance which the boat travels. Note .866 and .5 are the sines of sixty degrees and thirty degrees respectively.

Referring to FIGURE 3, it will subsequently be seen that when the boat travels due west, the multiplying signal provided by amplifier 52 to multiplier 62 is zero, thus indicating no change in latitude. Similarly on travelling due north, the signal provided by amplifier 50 to multiplier 60 will be zero, indicating no change in longitude.

Between the major compass points, it will become evident that the signals from the amplifiers 50 and 52 will depend on the position of the compass card relative to the fixed photoelectric cells 46 and 48 and will be a multiplying signal for the multipliers 60 and 62 which when multiplied with the signal representative of the speed of the boat from the amplifier 24 will produce a continuous signal the analog of which will represent the latitude and longitude of the boat.

The structure 16 for multiplying the signal proportional to the speed of the boat and the signals proportional to the direction of travel of the boat in latitude and longitude is common in the electronic arts and will not therefore be considered in detail herein. The multipliers 60 and 62 function to multiply two signals together which are fed thereto in accordance with the algebraic sign of the signals to provide a continuous output proportional to the algebraic product of the electrical signals fed thereto.

The signal from the multiplier 60 in the automatic navigation equipment 10 is fed to the reversible electric motor 64 and drives the motor 64 in opposite directions in accordance with the algebraic sign thereof. The gear box 66 is driven by the motor at a speed dependent on the driving signal from the multiplier 60 and rotates the longitude dial 68 in accordance with the direction of time of operation of the motor 64. Similarly the multiplier 62 drives the latitude dial 70 through the reversible motor 72 and gear box 74.

The indicators 68 and 70 may then always provide an indication of the latitude and longitude of the boat since the analog signal from the multipliers 60 and 62 are proportional to distance in the direction to change latitude and longitude.

With such structure it is necessary to change the algebraic sign of the signal fed to the multipliers 60 and 62 from the amplifiers 50 and 52 when the direction of travel changes from north to south and from east to west. In accordance with the present invention the changing of the aglebraic sign of the signals from the amplifiers 50 and 52 is accomplished through the sensor switches 76 and 78, respectively. As shown best in FIGURE 3, the sensor switches 76 and 78 each include an amplifier 80 and a polarity reversing solenoid operated switch 82.

In operation of sensor switches 76 and 78, when the solenoid 84 is energized due to a signal from the photoelectric cells 86 or 88 amplified through amplifier 80, the switch armatures 90 and 92 are drawn to the solenoid 84 to reverse the connections through the polarity reversing switch 82.

The photoelectric cells 86 and 88 provide an electric signal to the amplifier 80 only when the light sources 94 and 96 are permitted to energize them through the half-circular transparent portions 98 and 100 on the compass card 36.

Thus, in over-all operation, with the longitude and latitude indicators 68 and 70 set at the longitude and latitude of the beginning of movement of a boat and with the ship's log 20 operable to produce a signal proportional to the speed of a boat through water and the compass card 36 free to rotate in accordance with the earth's magnetic field, the light sources 38, 40, 94 and 96 are energized.

Thus, photoelectric cells 46 and 48 generate signals which are proportional to the direction of movement of the boat effective to change the latitude and longitude thereof due to the reflection of light from the light sources 38 and 40 through the prisms 42 and 44 and the annular transparent portions 56 and 58 in the compass card 36. The signals from the amplifiers 50 and 52 are then multiplied with the speed signal from apparatus 12 and integrated to provide analog signals from multipliers 60 and 62 proportional to the latitude and longitude of the boat in which the equipment 10 is installed.

The motors 64 and 72 and gear boxes 66 and 74 are connected to the output of the multipliers and drive the indicators 68 and 70 to provide a visual representation of the exact longitude and latitude of the boat at any time inasmuch as they provide a visual indication of the analog signal from the multiplier. The gear ratio in gear boxes 66 and 74 may of course be chosen so that the indicators 68 and 70 read directly in degrees of longitude and latitude.

In this operation the sensor switches 76 and 78 serve to reverse the polarity of the signals applied to the multipliers 60 and 62, as previously indicated, as the compass card passes through the major compass points wherein direction changes from north to south and from east to west.

While one embodiment of the present invention has been considered in detail, it will be understood that other embodiments and modifications are contemplated. For example, polarity switches, other than that illustrated in FIGURE 3, may be used with the position indicating apparatus if desired. It is therefore the intention to include all embodiments and modifications within the scope of the invention.

What I claim as my invention is:

1. Position indicating apparatus comprising means for developing a signal proportional to speed of travel, separate means for developing signals representing the east and west and the north and south components of the direction of travel, including a compass card, transparent portions in the compass card for both east and west and north and south signals which are annular and vary in size between opposed major compass points and a photoelectric signal generating cell positioned at one side of each of the transparent portions of the compass card and light sources on the other side of the transparent portions of the compass card, means for multiplying the signals representing the east and west and north and south components of the direction of travel by the signal proportional to the speed of travel and means for integrating the multiplied signals to produce analog output signals proportional to east or west and north or south movement for display as latitude and longitude positions.

2. Structure as set forth in claim 1 wherein the transparent portion associated with longitude varies from a minimum dimension at the north and south compass points to a maximum dimension at the east and west compass points in accordance with the cosine of the angle the direction of travel makes with a parallel of longitude.

3. Structure as set forth in claim 1 wherein the transparent portions of the compass card associated with latitude signals varies from a minimum dimension at the east and west compass points to a maximum dimension at the north and south compass points in accordance with the cosine of the angle the direction of travel makes with a parallel of latitude.

4. Position indicating apparatus comprising means for developing an electric signal proportional to speed of travel, separate and distinct means for developing electric signals proportional to the east or west and the north or south components of the direction of travel, means for producing a change in polarity in the east or west and the north or south signals to distinguish direction of movement, including a compass card, half circular transparent portions in the compass card oriented east, west and north, south, respectively, a photoelectric signal generating cell positioned on one side of the compass cards beneath each of the half circular transparent portions and light sources on the other side of the compass card positioned over the half circular transparent portions and a polarity reversing sensor switch connected to each photoelectric cell, means for multiplying the signals proportional to the east or west and the north or south components of the direction of travel by the signal proportional to the speed of travel and for integrating the multiplied signals to provide output signals proportional to east or west and north or south movement for display as positions of latitude and longitude.

5. Structure as set forth in claim 4 wherein the sensor switch includes an amplifier, a solenoid connected to the amplifier and solenoid operated contacts operably associated with the solenoid for reversing polarity of a signal received by the switch on the solenoid being energized.

References Cited

UNITED STATES PATENTS

| | | | |
|---|---|---|---|
| 2,744,683 | 5/1956 | Gray | 235—150.27 XR |
| 2,924,385 | 2/1960 | Burkhart | 235—150.271 |
| 3,206,719 | 2/1965 | Pure | 250—236 XR |
| 3,277,772 | 10/1966 | Atwood | 250—236 XR |
| 3,281,605 | 10/1966 | Davidson | 250—236 XR |

FOREIGN PATENTS 1,204,667  8/1959  France.

OTHER REFERENCES

F. B. Porterfield, "Photoelectric circuit breaker," IBM Technical Disclosure Bulletin, vol. 1, No. 4, December 1958, p. 8.

MALCOLM A. MORRISON, Primary Examiner

R. W. WEIG, Assistant Examiner

U.S. Cl. X.R.

235—189; 250—233, 236